United States Patent [19]
Hiner et al.

[11] Patent Number: 6,032,353
[45] Date of Patent: Mar. 7, 2000

[54] MAGNETIC HEAD WITH LOW STACK HEIGHT AND SELF-ALIGNED POLE TIPS

[75] Inventors: Hugh C. Hiner, Fremont; Billy Wayne Crue, San Jose; William D. Jensen; Lein-Chang Wang, both of Fremont; Durga P. Ravipati, Saratoga, all of Calif.

[73] Assignee: Read-Rite Corporation, Milpitas, Calif.

[21] Appl. No.: 08/857,138

[22] Filed: May 15, 1997

[51] Int. Cl.[7] .................................................. G11B 5/127
[52] U.S. Cl. ........................................ 29/603.14; 360/113
[58] Field of Search ......................... 29/603.14; 360/113, 360/119, 122, 126

[56] References Cited

U.S. PATENT DOCUMENTS 5,452,164  9/1995  Cole et al. ................................ 360/113
5,694,276  12/1997  Shen et al. ................................ 360/113

Primary Examiner—David A. Scherbel
Assistant Examiner—Benjamin M. Halpern
Attorney, Agent, or Firm—Nathan N. Kallman

[57] ABSTRACT

A magnetic head includes pole tips with aligned sidewalls and a low head profile. The aligned sidewalls are formed by depositing a stack of pole tip layers on a substrate. The stack of layers are etched through a common overlying mask. The stack of layers is covered over and around with a protective layer which is then planarized such that the stack of layers is exposed. The protective layer is etched to a predetermined thickness above the substrate, which is thinner than the thickness of the stack of layers. An inductive coil layer is deposited on the etched protective layer and covered with an overlying magnetic yoke layer which is dielectrically separated from the coil layer. The yoke layer thus formed assumes a low profile curvature due to the thin structure of the protective layer on the substrate. As a consequence, the overall stack height of the magnetic head is reduced, thereby reducing the inductance of the overlying yoke layer and further alleviating the step coverage problem of the magnetic head during fabrication.

21 Claims, 9 Drawing Sheets

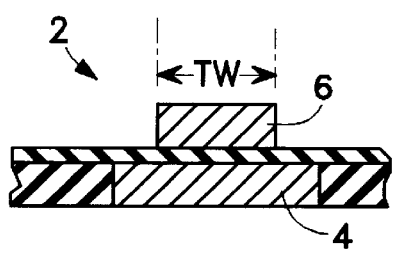
FIG. 1 (PRIOR ART)
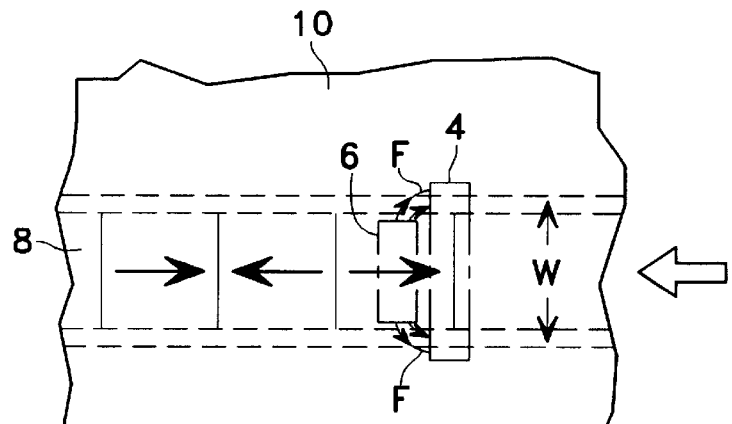
FIG. 1A (PRIOR ART)
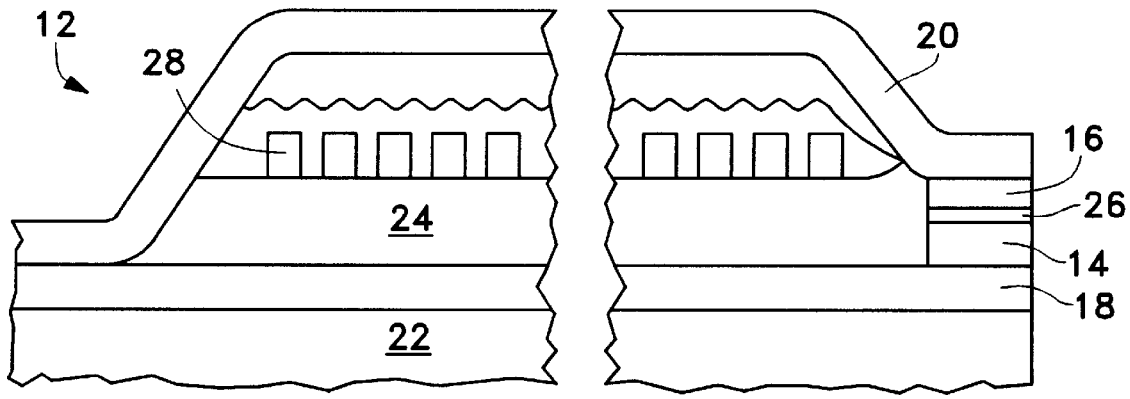
FIG. 2 (PRIOR ART)
FIG. 2A (PRIOR ART)
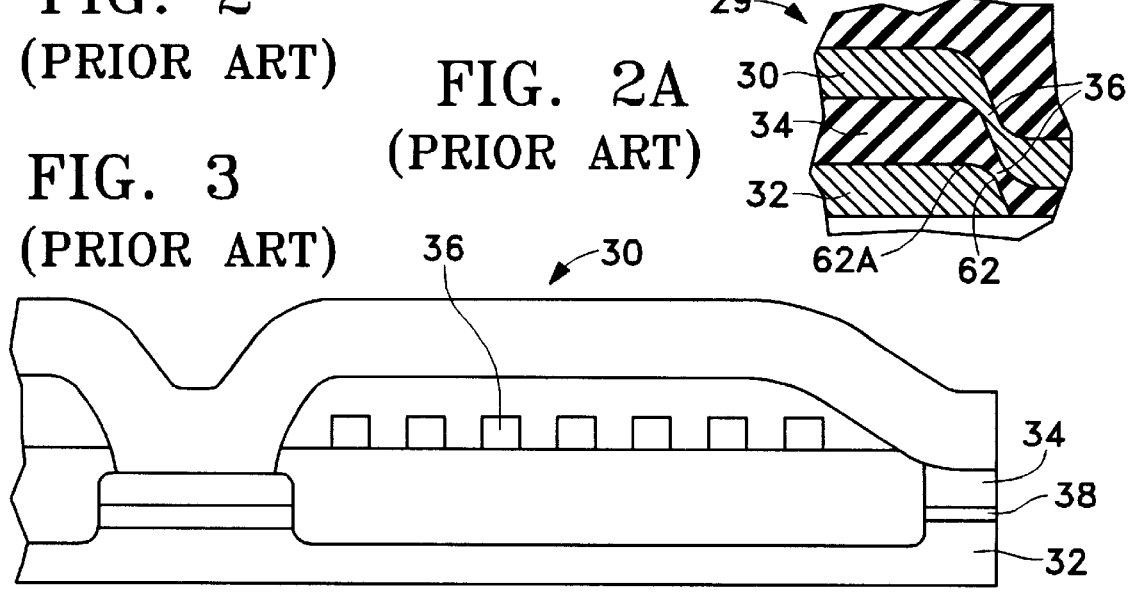
FIG. 3 (PRIOR ART)

MAGNETIC HEAD WITH LOW STACK HEIGHT AND SELF-ALIGNED POLE TIPS

FIELD OF THE INVENTION

This invention relates to methods of making magnetic heads having low profiles and narrow pole widths.

BACKGROUND OF THE INVENTION

An inductive magnetic head typically comprises an inductive coil sandwiched between a first yoke layer and a second yoke layer. The two magnetic yoke layers come into direct contact with each other at one end, to form a back closure, and define a narrow transducing gap at another end. The portions of the first and second yoke layers separated by the transducing gap are respectively called the first and second pole tips of the inductive head. To write data with narrow track widths and high linear recording densities, a magnetic head with narrow pole tips needs to be provided. However, there are technical difficulties associated with building a magnetic head with narrow pole tips. A key problem confronted by head manufacturers is the difficulty in the alignment of the two pole tips.

FIG. 1 shows a prior art approach in which a magnetic head 2 is fabricated with a first pole tip 4 wider in lateral dimension than a second pole tip 6. The wider first pole tip 4 tolerates a certain degree of misalignment during the deposition of the second pole tip 6. In the magnetic head 2, the width TW of the second pole tip 6 is intended to define the track width of the magnetic head 2. However, the problem with this approach is that due to the larger width of the first pole tip 4, magnetic flux fringing beyond the width of the second pole tip 6 is experienced. The fringing flux, such as flux lines F emanating from the second pole 6 to the first pole 4 as shown in FIG. 1A, would result in registering a data track 8 with a width W having ambiguous track boundaries, which seriously limit the track-to-track separations on the recording medium 10, such as a magnetic disk.

To solve the aforementioned problems, magnetic heads with pole tips having vertically aligned sidewalls have been suggested, exemplified by the magnetic head disclosed in U.S. Pat. No. 5,285,340, Ju et al., entitled "The Thin Film Magnetic Write Head with Conformable Pole Tips", issued Feb. 8, 1994. FIG. 2 illustrates the prior art magnetic head taught in Ju et al. The magnetic head 12 of Ju et al. includes first and second pole tips 14 and 16 "stitched" onto the respective first and second yoke layers 18 and 20. The magnetic head 12 is formed by first depositing the first yoke layer 18 onto a nonmagnetic substrate 22. A photoresist layer 24 is then spun atop the first yoke layer 18. An opening with vertically aligned inner sidewalls is formed in the photoresist layer 24. The first pole tip layer 14, the gap layer 26, and second pole tip layer 16 are sequentially deposited into the photoresist opening. After selective removal of the photoresist layer 24, the second yoke layer 20 is "stitched" onto the second pole tip layer 16. The magnetic head 12 of Ju et al. includes a coil layer 28 disposed on the top of the photoresist layer 24. The elevated coil layer 28 necessitates the second yoke layer 20 to be formed with large profile curvatures. The highly curved second yoke layer 20 is undesirable in several aspects in terms of fabrication and device performance.

In the processing of thin film products, the problem of step coverage always needs to be addressed. FIG. 2A illustrates the problem of step coverage which is commonly encountered in prior art thin film device fabrication. In the thin film structure 29 of FIG. 2A, a second metallic layer 30 is deposited on a first metallic layer 32 separated by an insulating layer 34. The second metallic layer 30 has to meander through a large profile curvature defined by the underlying insulating layer 34. During deposition of the second metallic layer 30, the depositing material has a tendency to migrate on the depositing surface. As a consequence, areas may be reduced in size or be devoid of deposited material, such as area 36 above the insulating layer 34 This also applies to the deposition of the insulating layer 34 above the first metallic layer 32. That is, the larger the profile curvature of the deposited layer, the higher the probability of exposing the deposited layer with areas of material weakness, such as areas 36 shown in FIG. 2A. If the areas with material deficiency occur in the second metallic layer 30, there may be an open circuit. If the area devoid of material happens in the insulating layer 34, there will be an electrical short bridging the overlying and underlying layers 30 and 32. If the second metallic layer 30 is a second yoke layer, such as the layer 20 in the magnetic head 12 shown in FIG. 2, it will be a malfunctioning head. Accordingly, in the fabrication of thin film products, excessive step coverage problems reduce final production yield and consequently increase manufacturing costs.

Moreover, the second yoke layer 20 with a high profile curvature also increases the inductance of the magnetic head 12. The reason is that the highly curved second yoke layer 20 unnecessarily lengthens the magnetic path. The longer the magnetic path, the higher would be the inductance. A magnetic head with yoke layers having high inductance is slow in response to writing current and incapable of performing high rate data transfer onto media with high areal densities.

It should also be noted that disclosed in the aforementioned U.S. Pat. No. 5,285,340 is a single layer coil 28. Modern day storage products are built with ever decreasing physical sizes and increasing storage capacities. Magnetic heads are fabricated on microscopically confined areas with limited heat dissipation capacity. To increase the sensitivity of the magnetic head without injecting excessive current into the inductive coil, the number of coil windings are accordingly increased. To maintain the small physical size for a magnetic head, the coil layers are normally stacked together. The deposition of additional coil layers would require additional profile curvature and exacerbate the problems as explained above.

U.S. Pat. No. 5,452,164, Cole et al., entitled "The Thin Film Magnetic Write Head", issued Sep. 19, 1995 discloses another magnetic head 30 as shown in FIG. 3 herein. The vertically aligned sidewalls of the first and second pole tips 32 and 34 are made possible by the process of ion milling. As with the magnetic head 12 of Cole et al. '164, the coil layer 36 of Ju et al. '340 is disposed above the gap layer 38. This arrangement also results in a tall stack height covered by a highly curved second yoke layer with the consequential problems as explained above.

Presently, storage products are built with smaller sizes and with higher storage capacities. There is a need to furnish these products with rapid data writing and fast data seeking time. These features place stringent requirements in the design of a magnetic head.

SUMMARY OF THE INVENTION

It is an object of the invention to provide a magnetic head capable of writing narrow data tracks with high linear recording densities.

It is another object of the invention to provide a magnetic head capable of high frequency operation.

It is yet another object of the invention to provide a magnetic head affording ease in fabrication, thereby increasing production yield with reduced manufacturing cost.

The fabrication of the novel magnetic head of this invention begins with forming a stack of layers on a substrate. The stack of layers is then etched through a common mask, resulting in the stack of layers formed on the substrate with aligned sidewalls. Thereafter, the stack of layers is covered over and around with a protective layer which is then planarized such that the stack of layers is exposed. An etching process is employed to etch the protective layer to a predetermined thickness, which is substantially thinner than the thickness of the stack of layers. An inductive coil layer is laid on the etched protective layer and covered with an overlying yoke layer which is dielectrically separated from the coil layer. The yoke layer thus formed assumes a low profile curvature due to the thin thickness of the protective layer on the substrate. As a consequence, the overall stack height of the magnetic head is reduced, thereby reducing the inductance of the overlying yoke layer and further alleviating the step coverage problem of the magnetic head during fabrication. Production costs are accordingly reduced. Furthermore, with the vertically aligned sidewalls, the side fringing flux from one pole tip to another is substantially reduced resulting in a magnetic head capable of writing data tracks with well defined boundaries during normal operations.

BRIEF DESCRIPTION OF THE DRAWINGS

The invention will be described in greater detail with reference to the drawings in which:

FIG. 1 is a cross-sectional front view of a portion of a prior art magnetic head having the first pole tip wider in lateral dimension than the second pole tip for allowing misalignment of the second pole tip during fabrication;

FIG. 1A schematically illustrates the effect of the side fringing flux on a registered data track written by the prior art magnetic head of FIG. 1;

FIG. 2 is a cross-sectional side view, partly broken away, of a prior art magnetic head having a second yoke layer with a relatively high profile curvature;

FIG. 2A is a cross-sectional view of a partial prior art thin film structure schematically illustrating the problem of step-coverage encountered during thin film product processing;

FIG. 3 is a cross-sectional side view of a portion of another prior art magnetic head having a second yoke layer with a relatively high profile curvature;

DETAILED DESCRIPTION OF THE INVENTION

Figure 4:
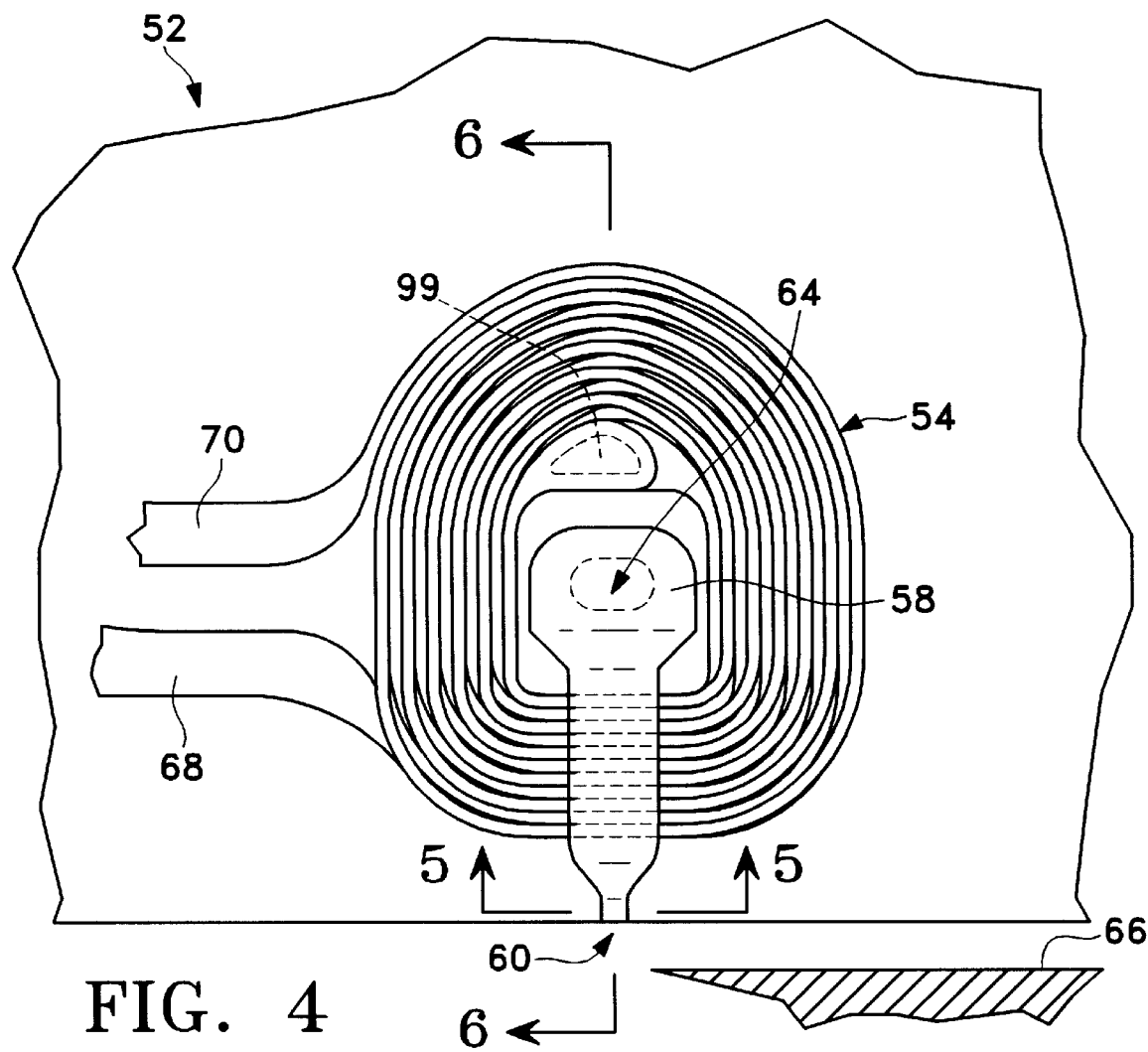
FIG. 4 is a top plan view, in part, of the magnetic head of the invention.
Figure 5:
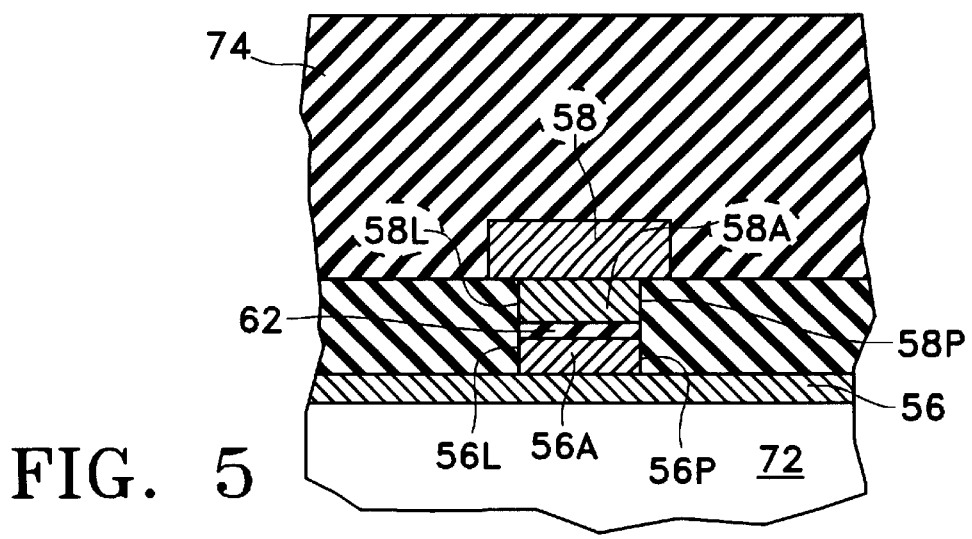
FIG. 5 is a cross-sectional front view taken along the line 5—5 of FIG. 4.

FIG. 4 shows the top plan view of a magnetic head 52 of the invention. For the sake of clarity in illustration, the top protective and insulating layers in FIG. 4 are removed so as to expose the relevant components of the magnetic head 52. However, the top layers are shown in FIGS. 5 and 6 which are cross-sectional front and side views taken along the lines 5—5 and 6—6, respectively, of FIG. 4.

Figure 6:
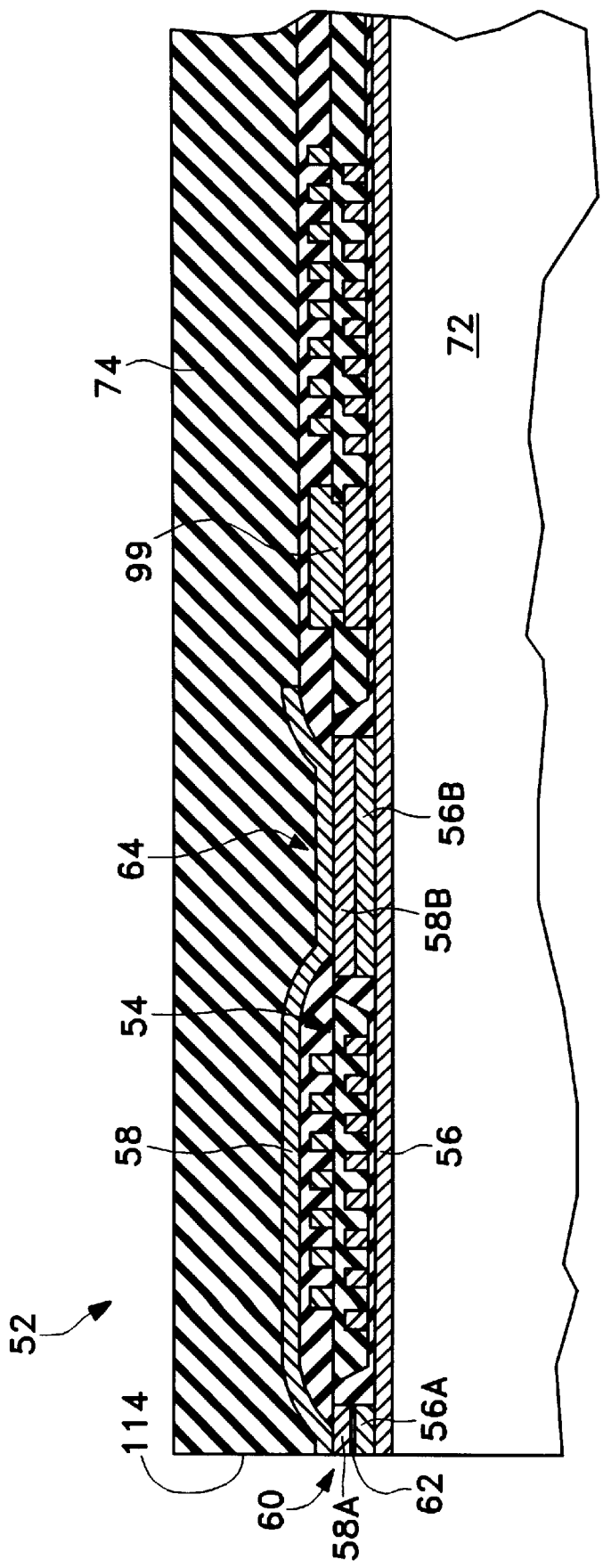
FIG. 6 is a cross-sectional side view taken along the line 6—6 of FIG. 4.

As shown in FIG. 6, in the preferred embodiment, the magnetic head 52 includes a bi-level coil 54 disposed between a first yoke layer 56 and a second yoke layer 58. At one end of the magnetic head 52 is the pole tip region 60 which includes a first pole tip 56A separated by a second pole tip 58A to define a transducing gap 62. A back gap region 64 has the first yoke layer 56 in contact with the second yoke layer 58 through contact layers 56B and 58B. The first and second yoke layers 56 and 58 form a closed magnetic path with the nonmagnetic transducing gap 62.

If the magnetic head 52 is implemented as a merged head, a separate magnetoresistive component (not shown), such as a anisotropic magnetoresistive (AMR) transducer or a giant magnetoresistive (GMR) transducer, is used to perform the data reading function.

If the head 52 is designed as an inductive head, the magnetic head 52 of the invention is disposed on a substrate 72 which can be made of a nonmagnetic and electrically insulating material such as alumina titanium carbide ($Al_2O_3$TiC) or silicon carbide (SiC). If the head 52 is part of a merged head, alternatively, the substrate 72 can be prefabricated with components. For example, in a merged head, various component layers for the read head may be fabricated in advance and thereafter serve as a substrate for the first yoke layer 56. In that case, the first yoke layer 56 may also be the second magnetic shield layer of the read head. There is also a protective overcoat layer 74 deposited above the second yoke layer 58.

The magnetic head 52 of the invention comprises vertically aligned sidewalks for the first and second pole tips 56A and 58A as shown in FIG. 5. Specifically, the left sidewall 56L of the first pole tip 56A is in vertical alignment with the left sidewall 58L of the second pole tip 58A. Similarly, the right sidewall 56P of the first pole tip 56A is flush with the right sidewall 58P of the second pole tip 58A. The aligned sidewalls 56L to 58L, and 56P to 56P substantially reduce fringing flux from one pole to another, thereby enabling the magnetic head 52 to write data with well defined data tracks on the medium surface 66, shown in FIG. 4.

Figure 7A:
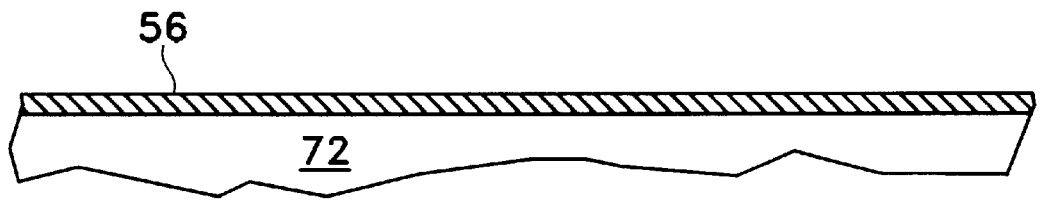
FIGS. 7A–7Z are sequential views schematically illustrating the process of forming the magnetic head of the invention as shown in FIGS. 4–6.
Figure 7B:
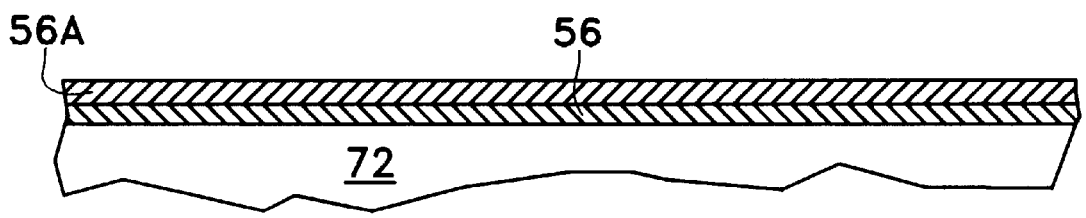
Figure 7C:
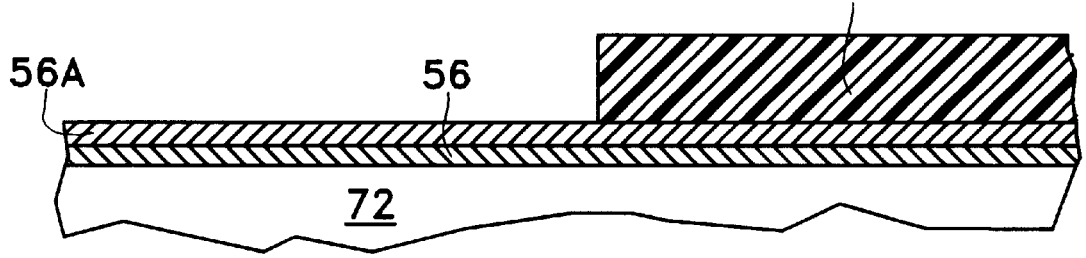
Figure 7D:
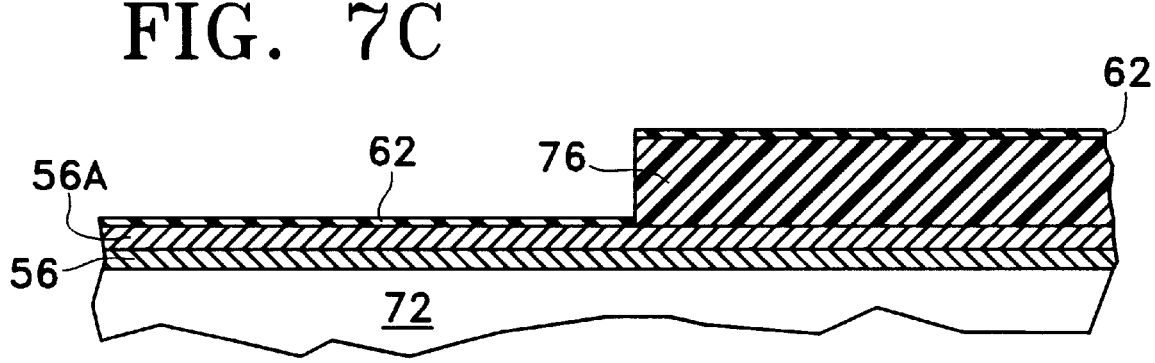
Figure 7E:
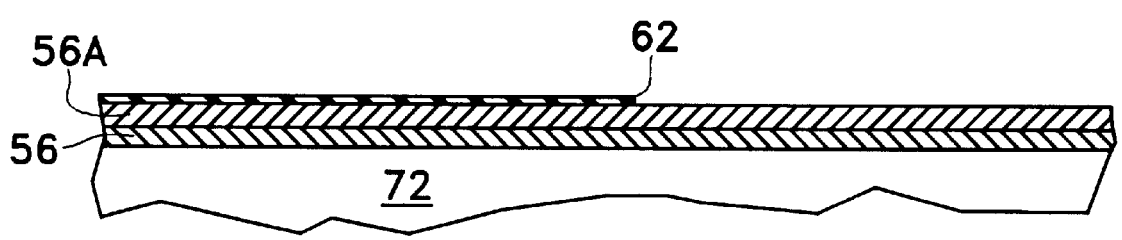
Figure 7F:
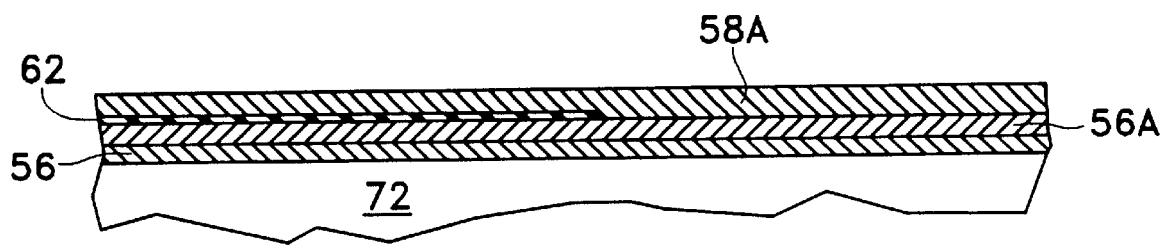
Figure 7G:
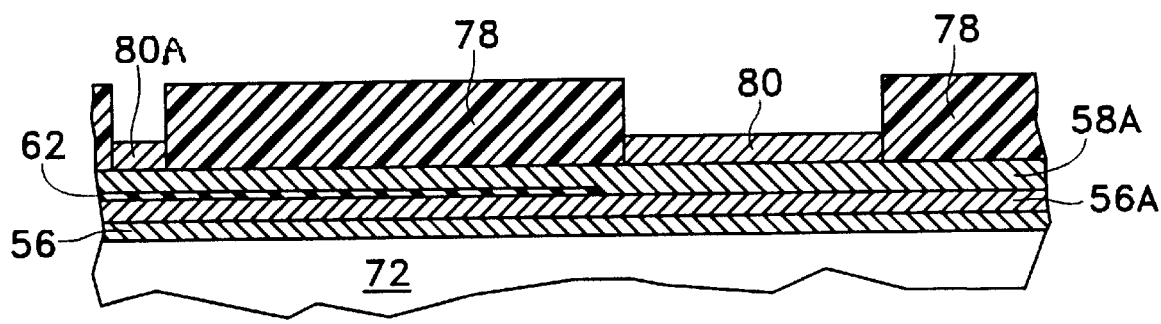
Figure 7H:
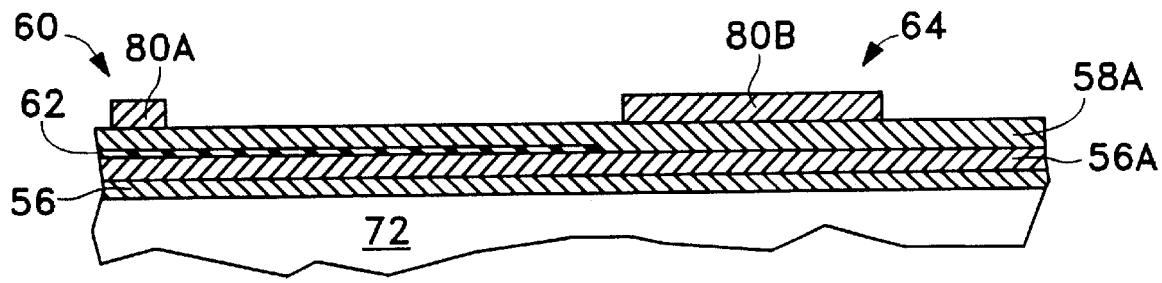
Figure 7I:
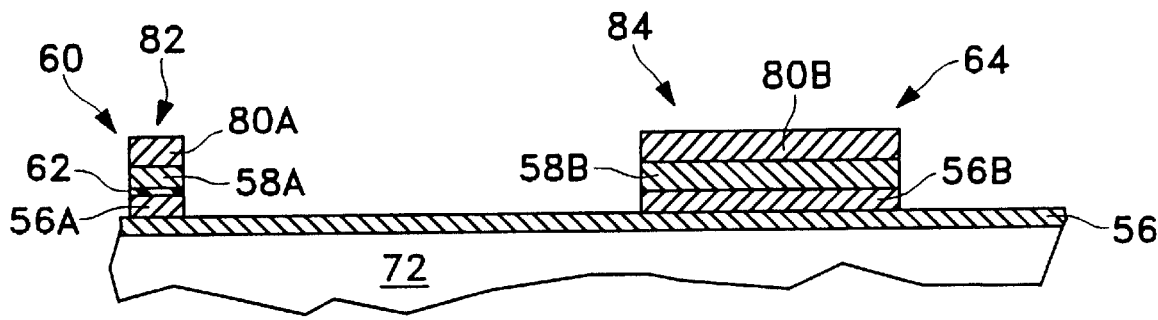
Figure 7J:
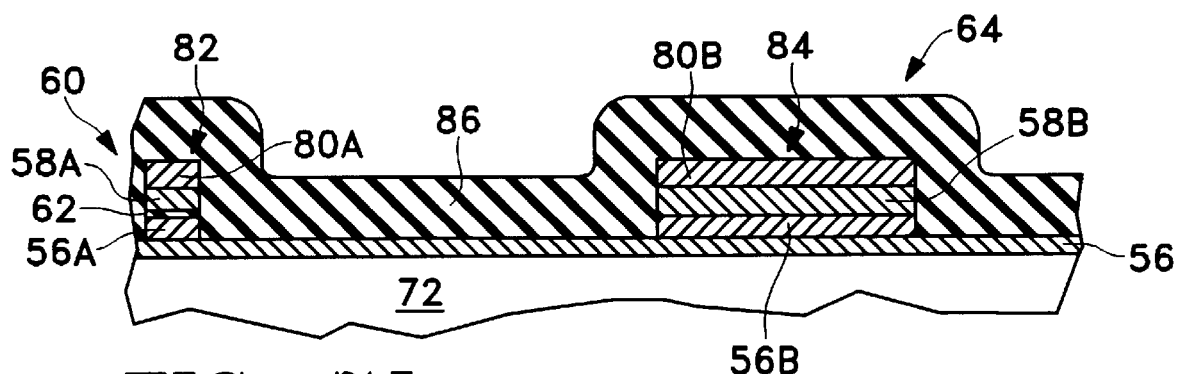
Figure 7K:
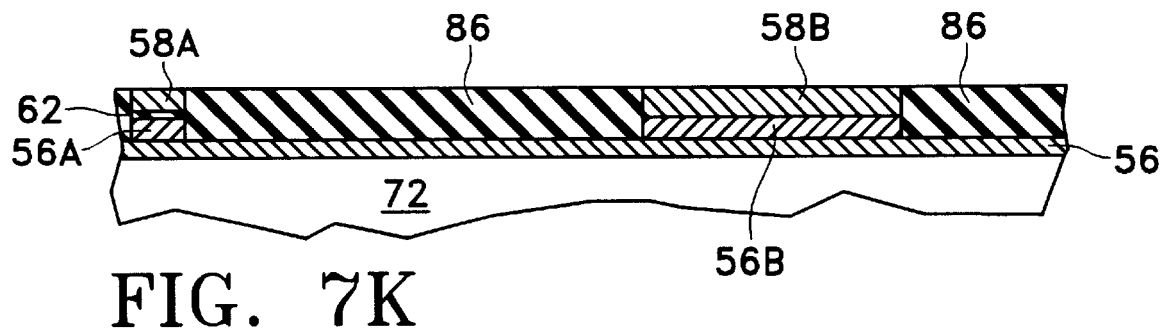
Figure 7L:
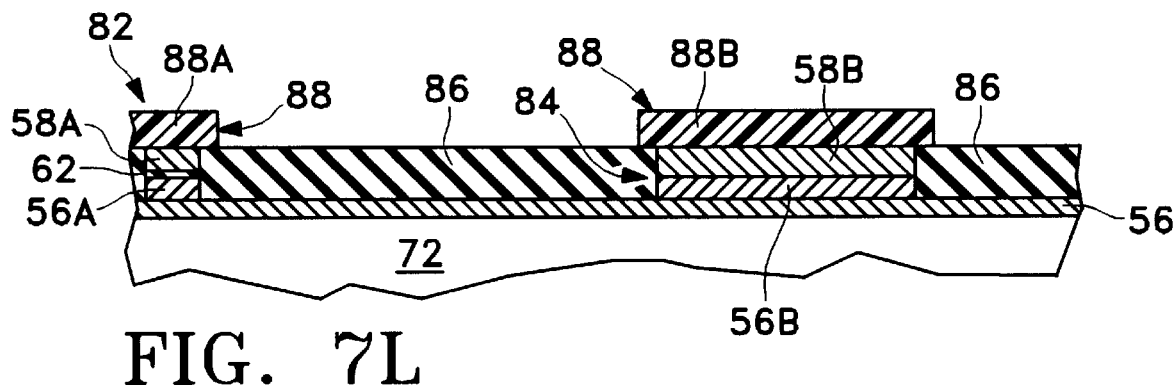
Figure 7M:
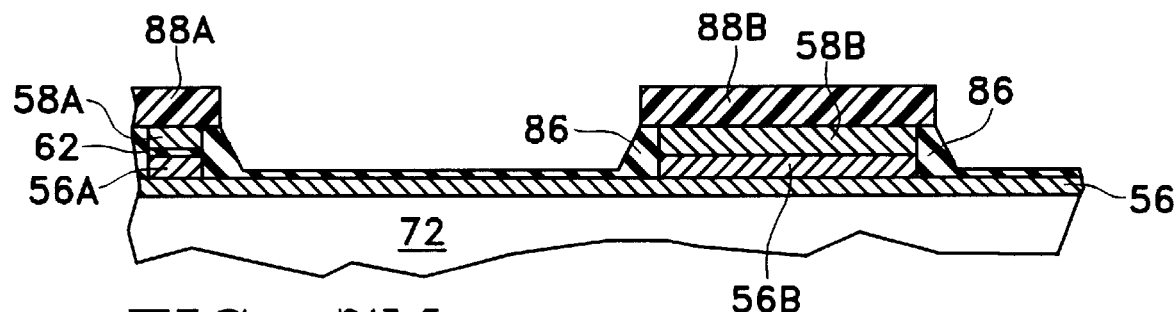
Figure 7N:
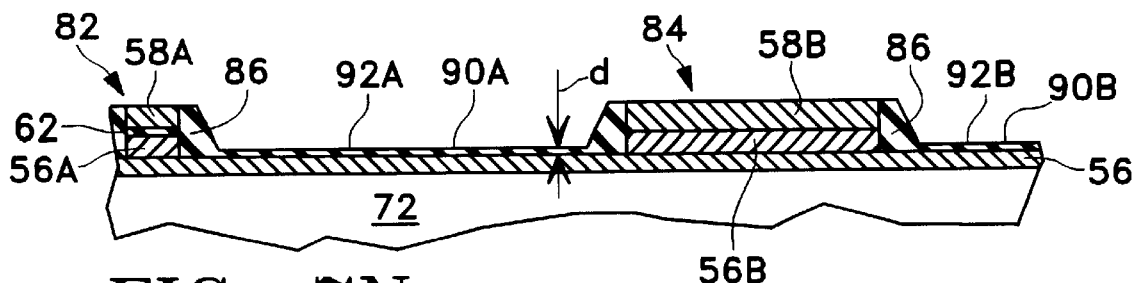
Figure 7O:
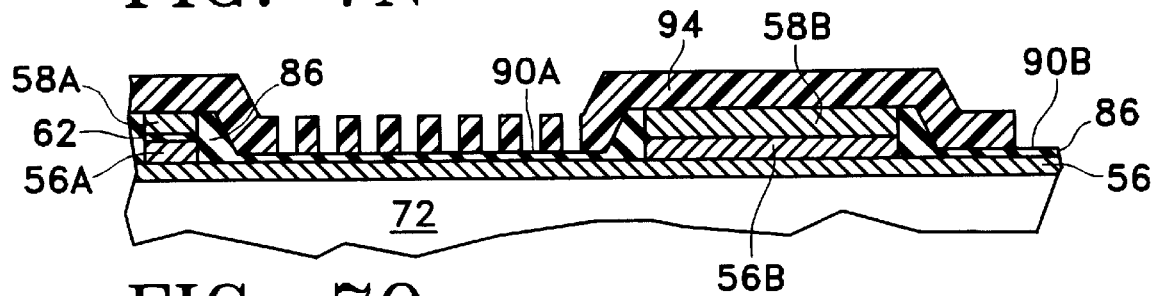
Figure 7P:
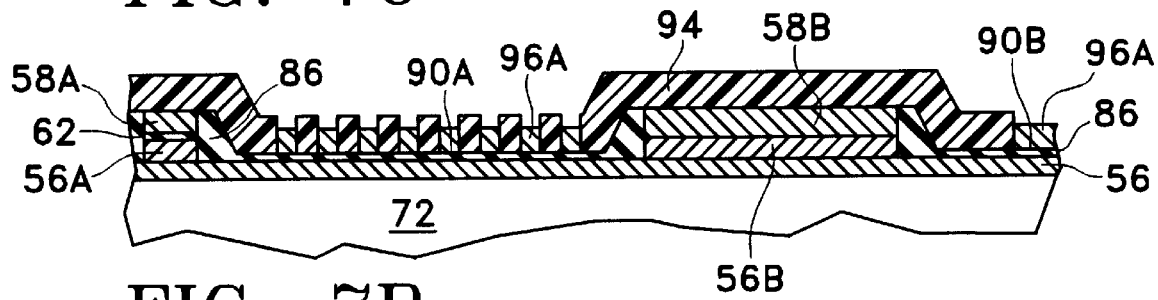
Figure 7Q:
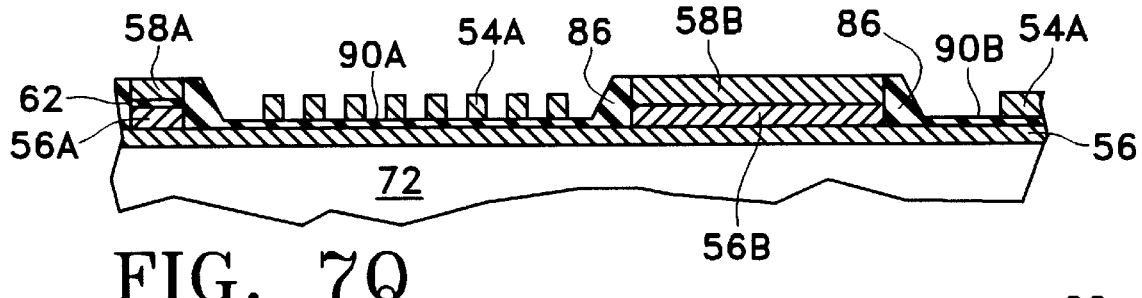
Figure 7R:
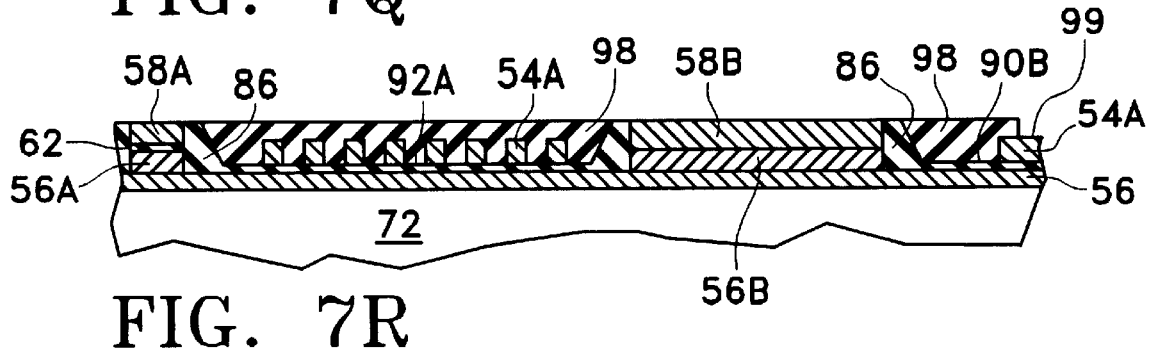
Figure 7S:
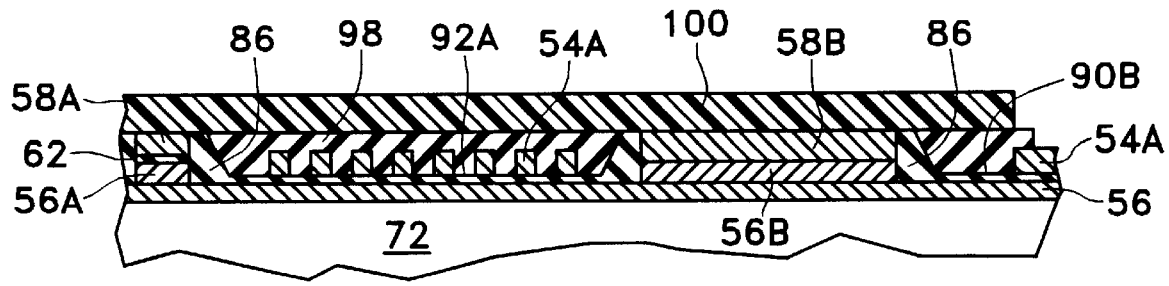
Figure 7T:
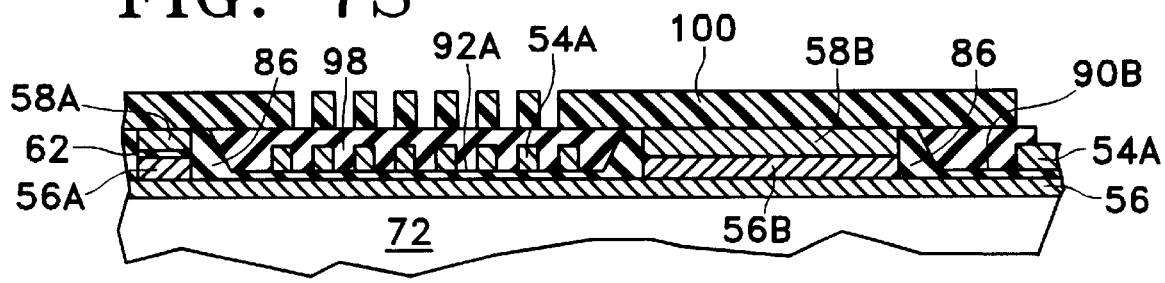
Figure 7U:
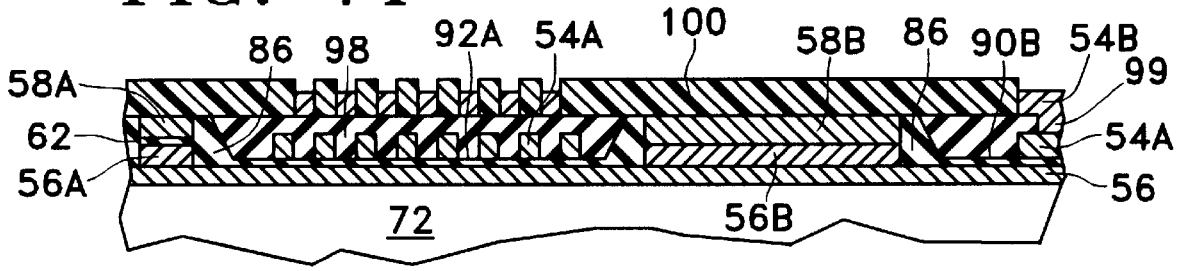
Figure 7V:
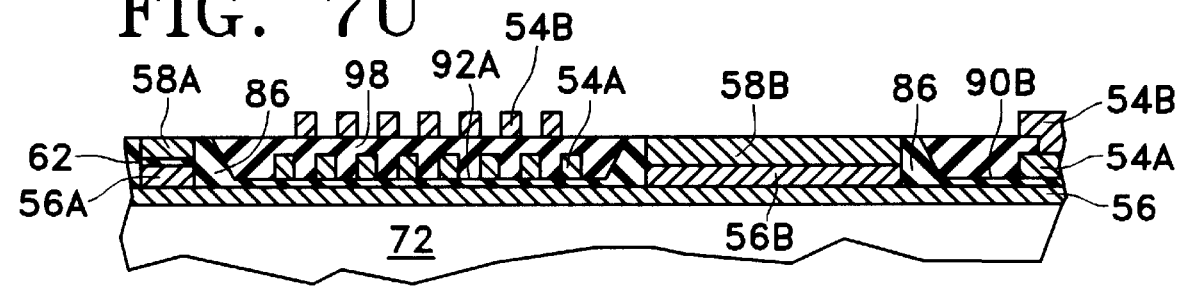
Figure 7W:
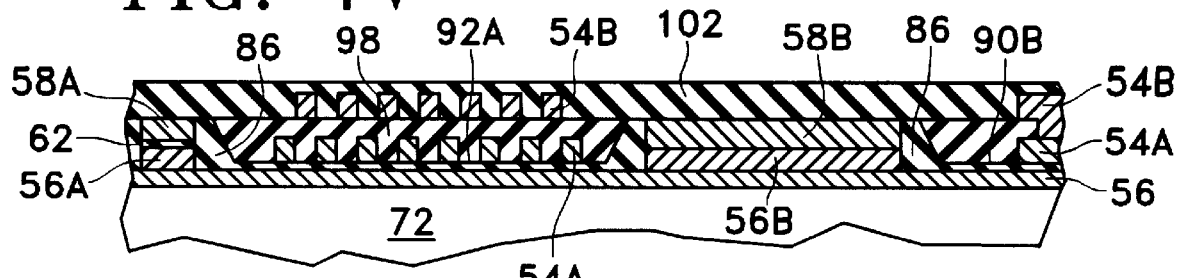
Figure 7X:
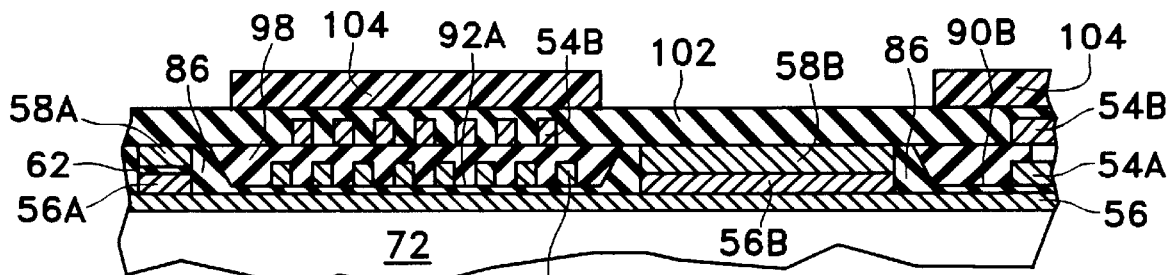
Figure 7Y:
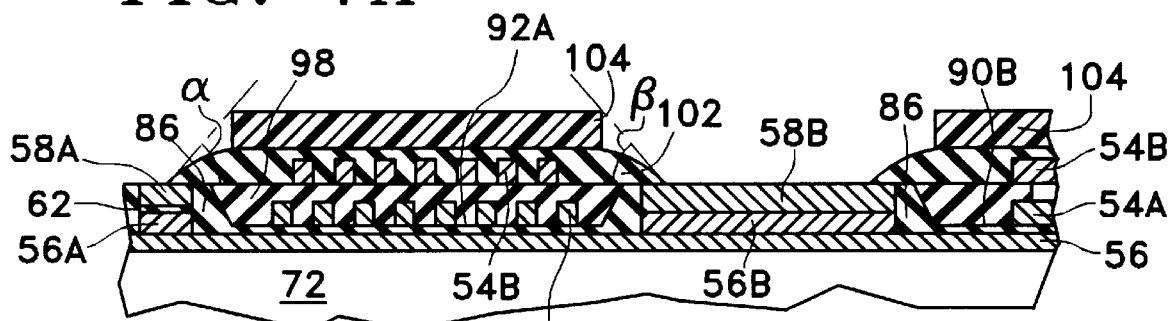
Figure 7Z:
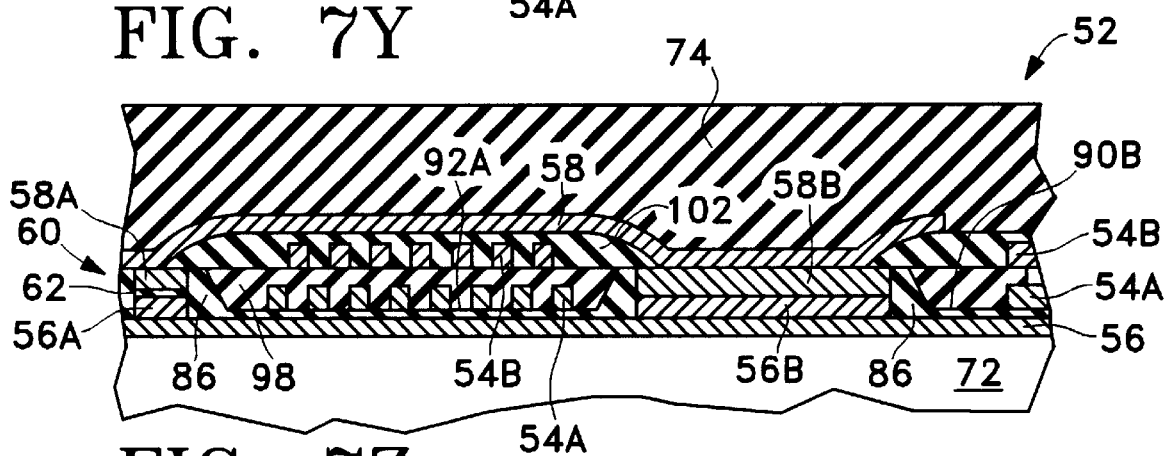

FIGS. 7A–7Z are sequential views which schematically illustrate the fabrication process of the magnetic head 52 of the invention.

First a substrate 72 needs to be provided. A first yoke layer 56 is deposited onto the substrate by sputtering to a thickness of approximately $0.5\mu$–$3.5\mu$, for example, as shown in FIG. 7A. These material used for the first yoke layer 56 can be any magnetic material with a high permeability and a low coercive force, such as Permalloy (NiFe). In addition to the above attributes, materials with high magnetic moments can also be used. Examples of such materials are cobalt based amorphous alloys and iron based alloys FeXN (where X=Ta, Zr, Al, Si or Rh). The use of a material with a high magnetic moment prevents the magnetic head 52 from running into premature magnetic saturation at the pole tip regions while writing data on a magnetic medium with high coercivity.

Alternatively, if the substrate is prefabricated with components, such as a merged head, there is a second shield layer which can also be shared as the first yoke layer. In that case, the first yoke layer is in place and there is no need to deposit the layer 56 as shown in FIG. 7A.

A first pole tip layer 56A is then either electroplated or sputtered onto the first yoke layer 56 to a thickness of about 0.8μ–2.5μ. In this embodiment, the material for the first pole tip layer 56A is formed of material with a high magnetic moment such as cobalt based amorphous alloys and iron based alloys FeXN (where X=Ta, Zr, Al, Si or Rh). The resultant structure up to this step is shown in FIG. 7B.

What follows is the deposition of a gap layer 62. First a photoresist mask 76 is patterned onto the first pole tip layer 56A by the conventional photolithography technique as shown in FIG. 7C. Thereafter, a gap layer 62 is deposited on the masked substrate 72 as shown in FIG. 7D. The photoresist layer 76 is then removed using a photoresist solvent. The gap layer 62 deposited on the top of the photoresist layer 76 is lifted off along with the removed photoresist material. The resultant structure up to this step is shown in FIG. 7E.

A second pole tip layer 58A is deposited onto the structure by sputtering, for example, as shown in FIG. 7F. Another photoresist mask 78 is patterned onto the second pole tip layer 58A. A masking material 80A and 80B, such as NiFe, is then electroplated onto the patterned photoresist mask 78, as shown in FIG. 7G. As an alternative, photoresist can be used as a substitute for the masking material 80A and 80B. In that case, the photoresist material can be directly patterned onto the second pole tip layer 58A but needs to be deposited at a larger thickness as an etchant shield for the subsequent etching process.

After the removal of the photoresist mask 78, two segments of the masking material 80A and 80B stay on the second pole tip layer 58A, as shown in FIG. 7H. The segments 80A and 80B respectively define the pole tip region 60 and the back gap region 64 of the magnetic head 52.

Relying on the masking segments 80A and 80B as shields, the structure undergoes an etching process. Either ion milling or reactive ion beam etching (RIBE) can be employed to etch away the unwanted portions of gap layer 62 and the pole tip layers 56A and 58A. After etching, the resulting structure up to this step is shown in FIG. 7I. In essence, stacks of layers 82 and 84 are formed above the substrate 72. It should also be noted that at this juncture, the first pole layer 56A is separated from the second pole tip layer 58A by gap layer 62 in the stack 82 at the pole tip region 60. However, the first pole layer 56B is in contact with the second pole tip layer 58B in the stack 84 at the back gap region 64.

Through th(e process of either sputtering or plasma enhanced chemical vapor deposition (PECVD), a protective layer 86 is deposited onto the substrate 72 with the stacks of layers 82 and 84. In the preferred method, the sputtering method is used and the protective layer 86 is deposited over and around the stacks of layers 82 and 84 to a thickness of approximately 3μ to 4μ. The resultant structure up to this step is shown in FIG. 7J.

The structure is then subjected to a leveling process in which the protective layer 86 is planarized via chemical mechanical lapping with the assistance of a slurry which may include alumina (Al$_2$O$_3$) or silicon dioxide (SiO$_2$) to open the second pole tip layer 58A. If necessary, ion milling is employed for to ensure complete removal of this material, thereby exposing the second pole tip layer 58A. The resultant structure up to this step is shown in FIG. 7K.

Another photoresist mask 88 is patterned onto the leveled protective layer 86. The mask 88 includes two mask segments 88A and 88B which are slightly oversized and cover the first and second stacks of layers 82 and 84, respectively, as shown in FIG. 7L.

The structure then undergoes another etching process. Either the RIBE method or the wet etching method can be employed. If the latter is selected, the wet etchant can be hydrofluoric acid (HF), phosphorous acid, sodium hydroxide or potassium hydroxide. After etching, the resultant structure up to this step is shown in FIG. 7M.

The photoresist mask 88 is then removed as shown in FIG. 7N. As a result of etching, there are two trenches 90A and 90B formed with planar surfaces 92A and 92B, respectively, on the substrate 72. In this method, the planar surfaces 92A and 92B are disposed below the gap layer 62. The protective layer 86 is etched to a predetermined thickness d which is substantially thinner than the thickness of either the stack 82 or the stack 84. The trenches 90A and 90B with the thickness d serve very important functions, A thin layer of copper (Cu) (not shown), called the seed layer, is sputtered onto the trenches 90A and 90B. A photoresist mask 94 is patterned onto the structure as shown in FIG. 7O.

A first coil layer 96A is electroplated on the patterned photoresist layer 94 as shown in FIG. 7P. The photoresist layer 94 is thereafter removed, resulting in the formation of the first coil layer 54A disposed on the planar surfaces 90A and 90B. The resultant structure up to this step is shown in FIG. 7Q. The Cu seed layer is thereafter etched away by lightly dipping the substrate 72 with the Cu seed layer in an etchant bath. A layer of dielectric material 98 is deposited onto the first coil layer 54A by either the PECVD method or the sputtering method. The dielectric material 98 can be selected from a variety of insulating materials such as Alumina (Al$_2$O$_3$), silicon dioxide (SiO$_2$), silicon nitride (Si$_3$N$_4$), aluminium nitride (AlN) or diamond-like carbon (DLC). After the planarization process, the resultant structure up to this step is shown in FIG. 7R.

A feedthrough 99 is formed in the protective layer 98 by conventional photolithography. The formation of the feedthrough 99 is for the purpose of electrically connecting the first coil layer 54A with the subsequently deposited second coil layer 54B. The resultant structure is sputtered with another thin seed layer (not shown) preferably formed of Cu. A photoresist layer 100 is spun atop the sewed layer (not shown) as shown in FIG. 7S. The photoresist layer 100 is then patterned using the conventional photolithography process as shown in FIG. 7T.

A second coil layer 54B is electroplated onto the patterned photoresist layer 100 as shown in FIG. 7U. The photoresist layer 100 is removed by a photoresist solvent. Again, the seed layer (not shown) is lightly etched away by the wet etching method. The resultant structure up to this step is shown in FIG. 7V.

Another layer of dielectric material 102 is then deposited onto the second coil layer 54B by the PECVD method. Again, the dielectric material used can be Alumina (Al$_2$O$_3$), silicon dioxide (SiO$_2$), silicon nitride (Si$_3$N$_4$), aluminium nitride (AlN) or diamond-like carbon (DLC). After the planarization process, the resultant structure up to this step is shown in 7W.

What follows is the formation of the second yoke layer. First, a photoresist mask 104 is patterned on top of the dielectric material 102. Either the technique of wet etching or RIBE can be employed to define the apex angles α and β of the second yoke layer 106. After etching and removal of the photoresist layer 104, a layer of high magnetic moment material 58, such as cobalt based amorphous alloys or various iron based alloys FeXN (where=Ta, Zr, Al, Si or Rh) can then be sputtered onto the dielectric material 102. Thereafter, the second yoke layer 58 can be patterned on the dielectric layer 102 via conventional photolithography, for example. Shown in FIG. 4 is the plan view of the second yoke layer 58 after the patterning process. After the laying of an overcoat layer 74 on top of the patterned second yoke layer 58, the resultant structure is as shown in FIG. 7Z.

A final lapping step is performed on the tip portion 60 of the magnetic head 52 for the purpose of securing a smooth air bearing surface (ABS) 114 as shown in FIG. 6.

Figure 8:
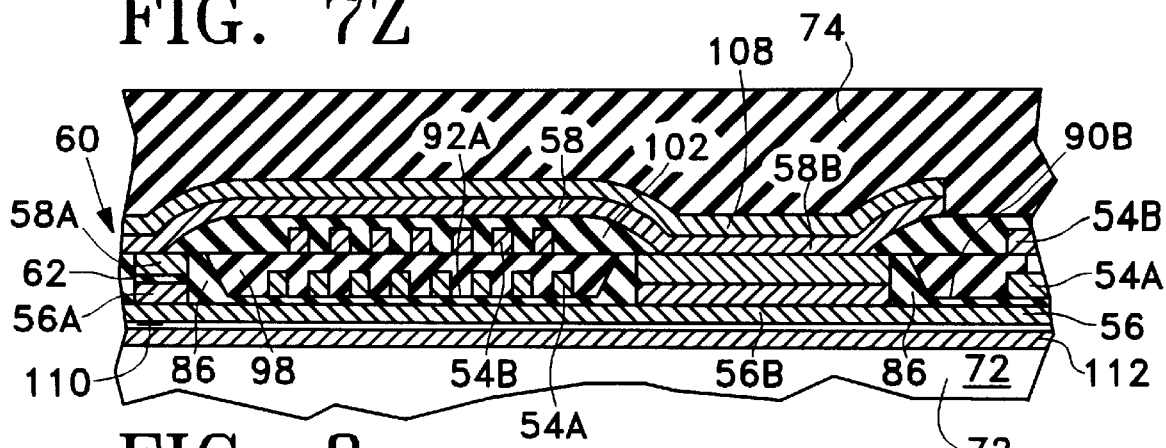
FIG. 8 is a cross-sectional side view, in part, of an alternative embodiment of the invention which includes a laminated layer over the second yoke layer.

Other variations are possible within the scope of the invention. For example, hard-baked photoresist can be used instead of the dielectric material 102. Furthermore, the second yoke layer 58 can be laminated with another magnetic material over the second yoke layer 58, such as the laminated layer 108 shown in FIG. 8. The laminated layer 108 impedes the formation of eddy current in the magnetic yoke and subsequently reduces inductive effects. This feature is especially advantageous in high frequency operations where eddy currents limit switching speeds. The material used for the laminated layer 108 can be NiFe, for example. In addition, as mentioned before, the substrate 72 can include a prefabricated read transducer 110 sandwiched between a first shield layer 112 and the first yoke layer 56 as shown in FIG. 8. These and other changes in form and detail may be made therein without departing from the scope and spirit of the invention.

What is claimed is:

1. A method of forming a magnetic head comprising the following steps in sequence:
   (a) providing a substrate;
   (b) forming a stack of layers on said substrate, said stack of layers including a first pole tip layer separated from a second pole tip layer by a gap layer;
   (c) depositing a protective layer over and around said stack of layers;
   (d) leveling said protective layer such that said second pole tip layer in said stack of layers is exposed;
   (f) patterning a masking layer above said second pole tip layer;
   (g) etching said protective layer using an etchant which significantly attacks said protective layer faster than said masking layer, thereby leaving said protective layer with a predetermined thickness on said substrate, said predetermined thickness being substantially thinner than the total thickness of said stack of layers; and
   (h) forming a coil layer above said protective layer.

2. The method of forming a magnetic head as set forth in claim 1 wherein said step of etching includes etching said protective layer to said predetermined thickness thinner than the thickness of said first pole tip layer.

3. The method of forming a magnetic head as set forth in claim 1 further comprising the steps of:
   (i) forming an insulating layer above said coil layer; and
   (j) forming a second yoke layer above said insulating layer such that a portion of said second yoke layer is in magnetic contact with said second pole tip layer at a back gap region.

4. A method of forming a magnetic head comprising the following steps in sequence:
   (a) providing a substrate;
   (b) forming a stack of layers on said substrate, said stack of layers including a first pole tip layer separated from a second pole tip layer by a gap layer;
   (c) depositing a protective layer over and around said stack of layers;
   (d) leveling said protective layer such that said second pole tip layer in said stack of layers is exposed;
   (f) patterning a masking layer above said second pole tip layer;
   (g) etching said protective layer using an etchant which significantly attacks said protective layer faster than said masking layer, thereby leaving said protective layer with a predetermined thickness on said substrate, said predetermined thickness being substantially thinner than the total thickness of said stack of layers;
   (h) forming a coil layer above said protective layers,
   (i) forming an insulating layer above said coil layer; and
   (j) forming a second yoke layer above said insulating layer such that a portion of said second yoke layer is in magnetic contact with said second pole tip layer at a back gap region;
   wherein said coil layer comprises a first coil member, and said step of forming a coil layer includes the substeps of forming a second coil member dielectrically separated from said first coil member and electrically connecting said first coil member with said second coil member by forming an electrical feedthrough in said protective layer prior to said step of forming an insulating layer.

5. The method of forming a magnetic head as set forth in claim 3 wherein said second yoke layer and said first and second pole tip layers are formed of a material selected from a group consisting of Permalloy, cobalt based amorphous alloys, and iron based alloys.

6. The method of forming a magnetic head as set forth in claim 1 wherein said step of depositing a protective layer includes sputtering said protective layer over and around said stack of layers and said step of leveling includes chemical mechanical lapping said protective layer and ion milling said protective layer when necessary such that said second pole tip layer is exposed.

7. The method of forming a magnetic head as set forth in claim 6 wherein said protective layer is formed of a material selected from a group consisting of alumina, silicon nitride, silicon dioxide, aluminum nitride and diamond-like carbon.

8. The method of forming a magnetic head as set forth in claim 1 wherein said step of depositing a protective layer includes depositing said protective layer over and around said stack of layers by plasma enhanced chemical vapor deposition, and said step of leveling said protective layer includes chemical mechanical lapping said protective layer and ion milling said protective layer when necessary such that said second pole tip layer is exposed.

9. The method of forming a magnetic head as set forth in claim 8 wherein said protective layer is formed of a material selected from a group consisting of alumina, silicon nitride, silicon dioxide, aluminum nitride and diamond-like carbon.

10. The method of forming a magnetic head as set forth in claim 1 wherein said step of etching includes etching said protective layer using a reactive ion beam which attacks said protective layer significantly faster than said masking layer.

11. The method of forming a magnetic head as set forth in claim 1 wherein said step of providing said substrate includes using a prefabricated read transducer.

12. A method of forming a magnetic head comprising the following steps in sequence:
   (a) providing a substrate;
   (b) depositing a first pole tip layer over said substrate;
   (c) depositing a gap layer over said first pole tip layer;
   (d) depositing a second pole tip layer over said gap layer;
   (e) patterning a first masking layer over said second pole tip layer;
   (f) etching said gap layer, said first and second pole tip layers through said first masking layer, thereby leaving a stack of layers formed on said substrate, said stack of layers having a surface area defined by said first masking layer;

(g) depositing a protective layer over and around said stack of layers;

(h) leveling said protective layer such that said second pole tip layer in said stack of layers is exposed;

(i) patterning a second masking layer above said second pole tip layer;

(j) etching said protective layer through said second masking layer such that said protective layer retains a predetermined thickness above said substrate, said predetermined thickness being substantially thinner than the total thickness of said stack of layers;

(k) forming a coil layer above said protective layer;

(l) forming an insulating layer above said coil layer; and (m) forming a second yoke layer above said insulating layer such that a portion of said second yoke layer is in contact with said second pole tip layer.

13. The method of forming a magnetic head as set forth in claim 12 wherein said step of providing said substrate includes using a prefabricated read transducer.

14. The method of forming a magnetic head as set forth in claim 12 wherein said step of depositing a protective layer includes depositing a layer of alumina over and around said stack of layers, and said step of leveling includes chemical mechanical lapping said protective layer and thereafter ion milling said protective layer when necessary such that said second pole tip layer is exposed.

15. The method of forming a magnetic head as set forth in claim 14 wherein said step of etching said protective layer includes etching said protective layer through said second masking layer using a reactive ion beam which attacks said protective layer significantly faster than said second masking layer.

16. The method of forming a magnetic head as set forth in claim 15 wherein said step of etching said protective layer includes etching said protective layer to said predetermined thickness which is thinner than the thickness of said first pole tip layer.

17. A method of forming a magnetic head comprising the following steps in sequence:

(a) providing a substrate;

(b) depositing a first pole tip layer over said substrate;

(c) depositing a gap layer over said first pole tip layer;

(d) depositing a second pole tip layer over said gap layer;

(e) patterning a first masking layer over said second pole tip layer;

(f) etching said gap layer, said first and second pole tip layers through said first masking layer, thereby leaving a stack of layers formed on said substrate, said stack of layers having a surface area defined by said first masking layer;

(g) depositing a protective layer over and around said stack of layers;

(h) leveling said protective layer such that said second pole tip layer in said stack of layers is exposed;

(i) patterning a second masking layer above said second pole tip layer;

(j) etching said protective layer through said second masking layer such that said protective layer retains a predetermined thickness above said substrate, said predetermined thickness being substantially thinner than the total thickness of said stack of layers;

(k) forming a coil layer above said protective layer;

(l) forming an insulating layer above said coil layer; and (m) forming a second yoke layer above said insulating layer such that a portion of said second yoke layer is in contact with said second poles tip layer;

wherein said step of depositing a protective layer includes depositing a layer of alumina over and around said stack of layers, and said step of leveling includes chemical mechanical lapping said protective layer and thereafter ion milling said protective layer when necessary such that said second pole tip layer is exposed;

wherein said step of etching said protective layer includes etching said protective layer through said second masking layer using a reactive ion beam which attacks said protective layer significantly faster than said second masking layer;

wherein said step of etching said protective layer includes etching said protective layer to said predetermined thickness which is thinner than the thickness of said first pole tip layer:

wherein said coil layer includes a first coil member, said step of forming a coil layer further includes the substeps of forming a second coil member dielectrically separated from said first coil member and electrically connecting said first coil member with said second coil member by forming an electrical feedthrough in said protective layer prior to said step of forming an insulating layer.

18. The method of forming a magnetic head as set forth in claim 17 further including the step of depositing an overcoat layer over said second yoke layer.

19. The method of forming a magnetic head as set forth in claim 18 wherein said second yoke layer, and said first and second pole tip layers are formed of a material selected from a group consisting of Permalloy, cobalt based amorphous alloys, and iron based alloys.

20. The method of forming a magnetic head as set forth in claim 19 wherein said step of providing said substrate includes using a prefabricated read transducer.

21. A method of forming a magnetic head comprising the following steps in sequence:

(a) providing a substrate;

(b) depositing a first pole tip layer over said substrate;

(c) depositing a gap layer over said first pole tip layer;

(d) depositing a second pole tip layer over said gap layer;

(e) patterning a first masking layer over said second pole tip layer;

(f) etching said gap layer, said first and second pole tip layers through said first masking layer, thereby leaving a stack of layers formed on said substrate, said stack of layers having a surface area defined by said first masking layer;

(g) depositing a protective layer over and around said stack of layers;

(h) leveling said protective layer such that said second pole tip layer in said stack of layers is exposed;

(i) patterning a second masking layer above said second pole tip layer;

(j) etching said protective layer through said second masking layer such that said protective layer retains a predetermined thickness above said substrate, said predetermined thickness being substantially thinner than the total thickness of said stack of layers;

(k) forming a coil layer above said protective layer;

(l) forming an insulating layer above said coil layer; and (m) forming a second yoke layer above said insulating layer such that a portion of said second yoke layer is in contact with said second pole tip layer;

wherein said step of forming a second yoke layer includes laminating a layer of magnetic material over said second yoke layer.

* * * * *